(12) United States Patent
Lewis (10) Patent No.: US 11,241,077 B2
(45) Date of Patent: *Feb. 8, 2022

(54) PORTABLE DEVICE ACCESSORY

(71) Applicant: Ryan Carson Lewis, Atlanta, GA (US)

(72) Inventor: Ryan Carson Lewis, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/988,520

(22) Filed: Aug. 7, 2020

(65) Prior Publication Data

US 2020/0367634 A1 Nov. 26, 2020

Related U.S. Application Data

(63) Continuation-in-part of application No. 16/694,572, filed on Nov. 25, 2019, now Pat. No. 10,771,603, which is a continuation-in-part of application No. 16/582,984, filed on Sep. 25, 2019, now abandoned.

(60) Provisional application No. 62/735,956, filed on Sep. 25, 2018.

(51) Int. Cl.
| | |
|---|---|
| *A45F 5/10* | (2006.01) |
| *F16M 11/04* | (2006.01) |
| *F16M 13/02* | (2006.01) |
| *H04M 1/04* | (2006.01) |
| *A45C 11/00* | (2006.01) |

(52) U.S. Cl.
CPC ......... *A45F 5/102* (2013.01); *F16M 11/041* (2013.01); *F16M 13/022* (2013.01); *H04M 1/04* (2013.01); *A45C 2011/002* (2013.01); *A45C 2200/15* (2013.01); *A45F 2200/0516* (2013.01); *A45F 2200/0525* (2013.01)

(58) Field of Classification Search
CPC . H04N 5/2253; A45F 5/10; A45F 2200/0525; A45F 2200/0516; H04M 1/04; G06F 1/1626
See application file for complete search history.

(56) References Cited

U.S. PATENT DOCUMENTS

| | | | | |
|---|---|---|---|---|
| 9,243,739 | B2 * | 1/2016 | Peters | F16M 13/00 |
| 9,850,926 | B2 * | 12/2017 | Buchanan | F16M 13/02 |
| 10,550,992 | B2 * | 2/2020 | Yun | F16M 13/04 |
| 2013/0181584 | A1 * | 7/2013 | Whitten | A45C 11/00 |
| | | | | 312/223.1 |
| 2013/0318775 | A1 * | 12/2013 | Peters | A45F 5/00 |
| | | | | 29/592.1 |
| 2018/0051846 | A1 * | 2/2018 | Hobbs | F16M 13/00 |
| 2018/0283600 | A1 * | 10/2018 | Hobbs | F16M 13/04 |
| 2019/0009850 | A1 * | 1/2019 | Peters | H04B 1/3822 |

(Continued)

*Primary Examiner* — Lewis G West (57) ABSTRACT

The present invention is a portable device accessory that includes a cover, a plurality of hooks, a connector, a first adhesive pad, and a second adhesive pad. The first adhesive pad is attached to one side of the connector. The other side of the connector is attached to a portable device, such as mobile phone, by the second adhesive pad. The user may remove the cover to reveal the first adhesive pad, then temporary attaches the first adhesive pad to a mounting surface so the user may take a selfie with the portable device. After the portable device accessory is detached from the mounting surface, the user may place the cover over the first adhesive pad and pressed the cover and the connector towards each other thus enabling the plurality of attachments to be frictionally attach around a lateral wall of the connector.

8 Claims, 10 Drawing Sheets (56) References Cited

U.S. PATENT DOCUMENTS

2019/0154190 A1* 5/2019 Yun .................... F16M 11/105
2021/0218277 A1* 7/2021 Nahum .................. H01F 38/14

* cited by examiner

PORTABLE DEVICE ACCESSORY

The current application is a continuation-in-part (CIP) application of a U.S non-provisional application Ser. No. 16/694,572 filed on Nov. 25,2019. The U.S. non-provisional application Ser. No. 16/694,572 claims a priority to a U.S. non-provisional application Ser. No. 16/582,984 filed on Sep. 25, 2019. The U.S. non-provisional application Ser. No. 16/582,984 claims a priority to a U.S. provisional application Ser. No. 62/735,956 filed on Sep. 25, 2018.

FIELD OF THE INVENTION

The present invention generally relates to an incrementally-sizeable grip/stand accessory known as popsocket grip. More specifically, the present invention is an accessory attachment for popsocket grip so that the user may mount a portable electronic device to different mounting surfaces or position the portable electronic device to perform different functions like taking picture or video.

BACKGROUND OF THE INVENTION

Portable devices such as cellular phone or tablet are carried by most people on daily, or even hourly basis because they are very convenient to carry around and powerful enough for the users to complete many tasks. Most people cannot even leave home without carrying a portable device, due to massive amounts of social network interactions accessible from portable devices. For example, many users take a selfie or other pictures to post on Facebook, Instagram, Twitter, or other websites with portable devices. However, issues arise because most portable devices do not have any attaching mechanism to enable to user to attach the portable device to another surface. While selfie stick does exist, this issue remained unsolved, because the selfie stick cannot cover all the different angles, and has limited flexibility, since the user must use one hand to hold the selfie stick, and the selfie stick only extends to a certain length. Also, the selfie stick and other phone mounts are bulky and require the user to carry an additional device with them.

The present invention provides a solution to all above-mentioned issues by providing an accessory attachment, which allow the user to quickly attach and detach the portable electronic device to various mounting surfaces. The present invention can be attached to an accessory on the portable electronic device known as popsocket grip. Then, the user may attach the present invention along with the portable electronic device to various mounting surfaces to take a picture, a video clip, or just perform other functions such as playing music or video. The present invention is both small and flexible, so it does not occupy too much space when attaching to the portable device and can easily be carried on the user's phone wherever they go. Moreover, the present invention is flexible enough to attach to different portable electronic devices or accessories to expand the functions of portable electronic devices. This invention strives to be a universal mount for our portable electronic devices to enable us to use have full use of these devices hands-free wherever we go.

DETAIL DESCRIPTIONS OF THE INVENTION

All illustrations of the drawings are for the purpose of describing selected versions of the present invention and are not intended to limit the scope of the present invention.

The present invention is a portable device accessory that allows the user to temporarily attach portable electronic devices such as mobile phones or tablets to different mounting surfaces to take pictures or videos. More specifically, the present invention can be attached to an incrementally-sizeable grip/stand accessory, also known as popsocket grip, so that the portable electronic devices can be attached to different mounting surfaces. The present invention transforms a regular phone grip into a portable and universal phone mount that can easily be carried with a user anywhere.

Figure 1:
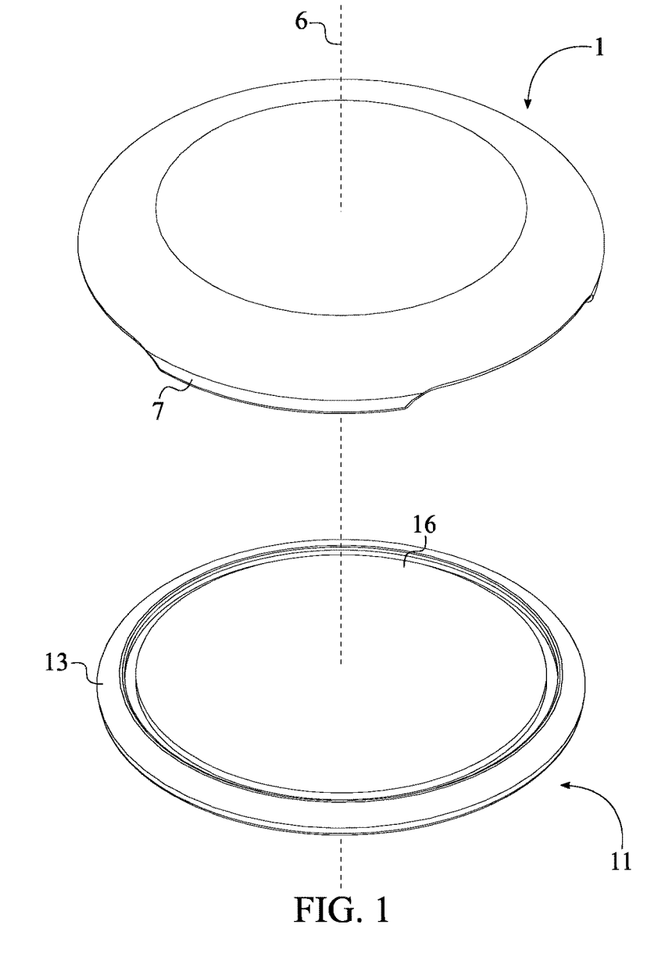
FIG. 1 is a top perspective exploded view of the present invention.
Figure 2:
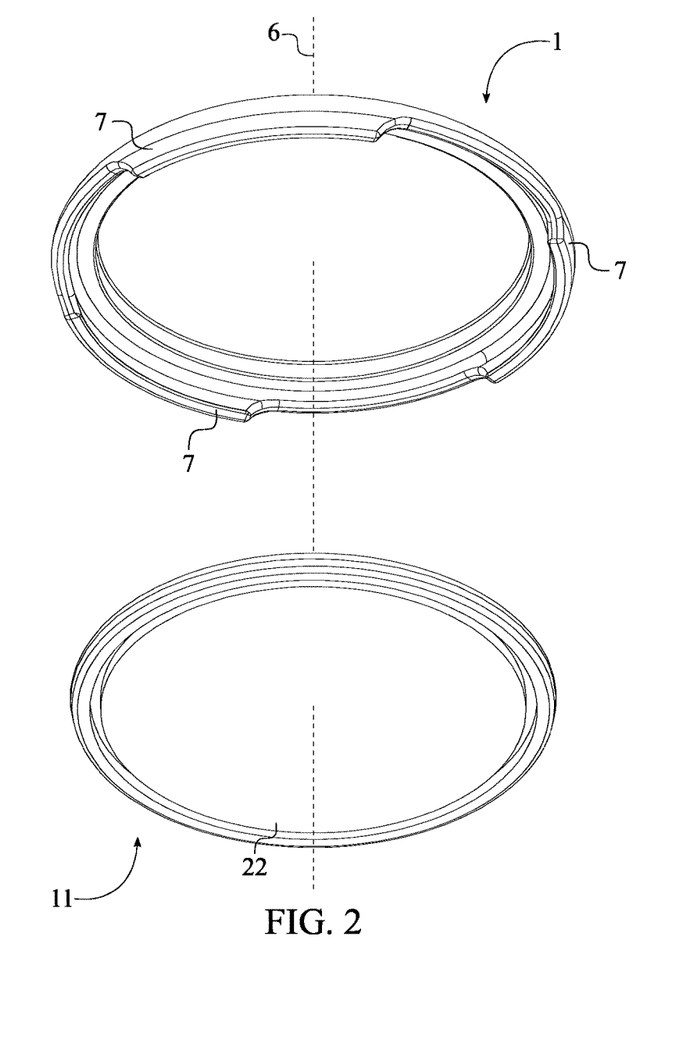
FIG. 2 is a bottom perspective exploded view of the present invention.

In reference to FIG. 1-2, the present invention comprises a cover 1, a plurality of attachments 7, a connector 11, a first adhesive pad 16, and a second adhesive pad 22. The cover 1 is configured to prevent dust or other objects from contacting the first adhesive pad 16. The plurality of attachments 7 is radially distributed on the cover 1 and adjacently connected to the cover 1. The plurality of attachments 7 is configured to attach the cover 1 to the connector 11 when the user wishes to cover or seal the first adhesive pad 16. The plurality of attachments 7 functions as friction-fit attachments to lock/attach the cover 1 onto the connector 11 thus enclosing the entire first adhesive pad 16. Furthermore, the cover 1 is prevented from falling off from the connector 11 by accident or other impacts due to the configuration of the plurality of attachments 7. In other words, the connector 11 and the cover 1 are attached/removably mounted to each other by the plurality of attachments 7 and a lateral wall 13 of the connector 11.

In reference to FIGS. 1 and 2, the first adhesive pad 16 is positioned between the cover 1 and the connector 11 so that the first adhesive pad 16 can be selectively enclosed or opened by the cover 1. The first adhesive pad 16 is terminally connected to the connector 11 as the first adhesive pad 16 is configured to temporarily attach the connector 11 to the mounting surface. The second adhesive pad 22 is also terminally connected to the connector 11; however, the first adhesive pad 16 and the second adhesive pad 22 are concentrically positioned opposite of each other about the connector 11. The second adhesive pad 22 is utilized to temporarily attach the present invention to the popsocket grip, wherein the first adhesive pad 16 and the second adhesive pad 22 complete the bridge between the mounting surface and the portable electronic devices.

Figure 3:
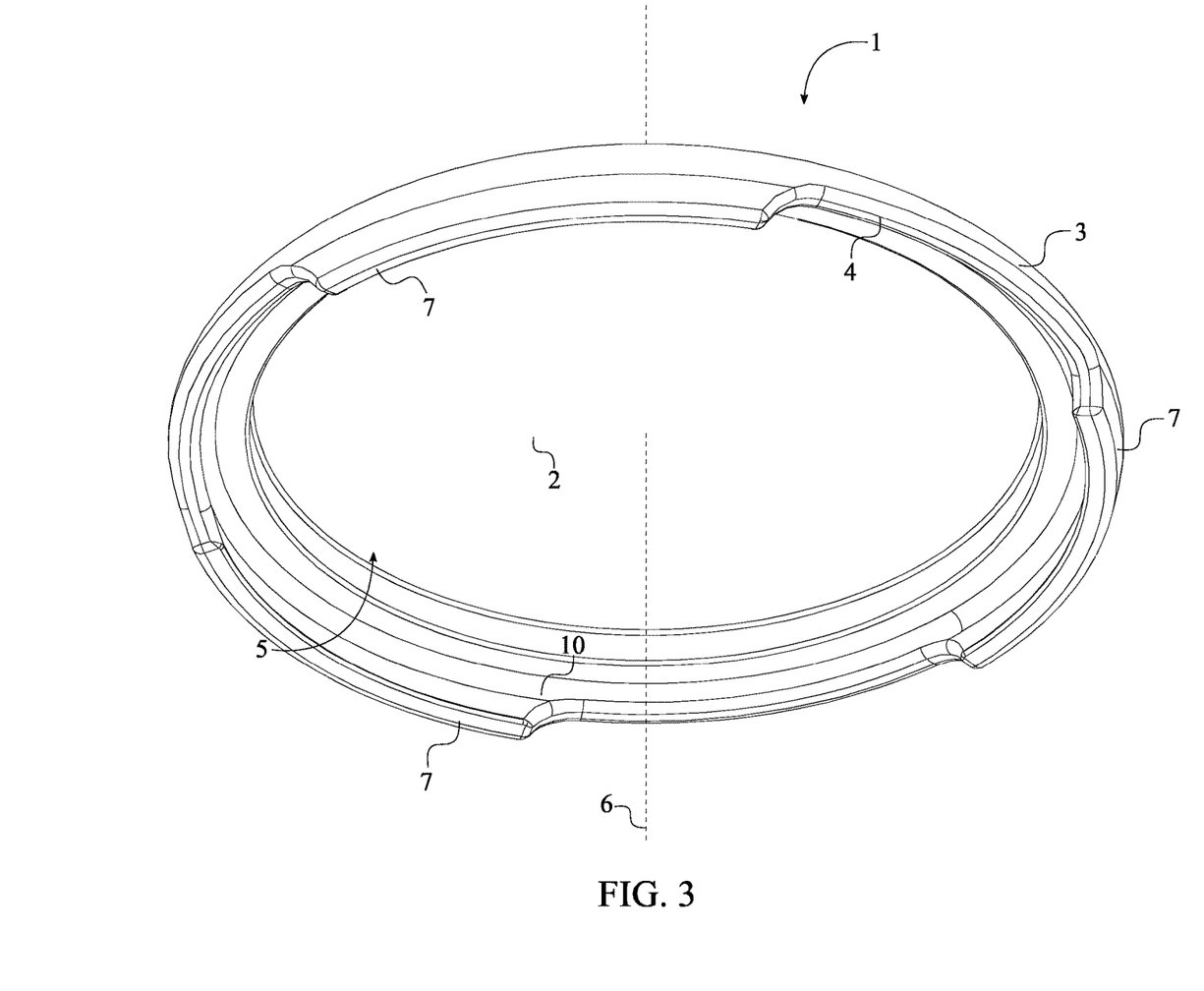
FIG. 3 is a bottom perspective view of the cover.
Figure 4:
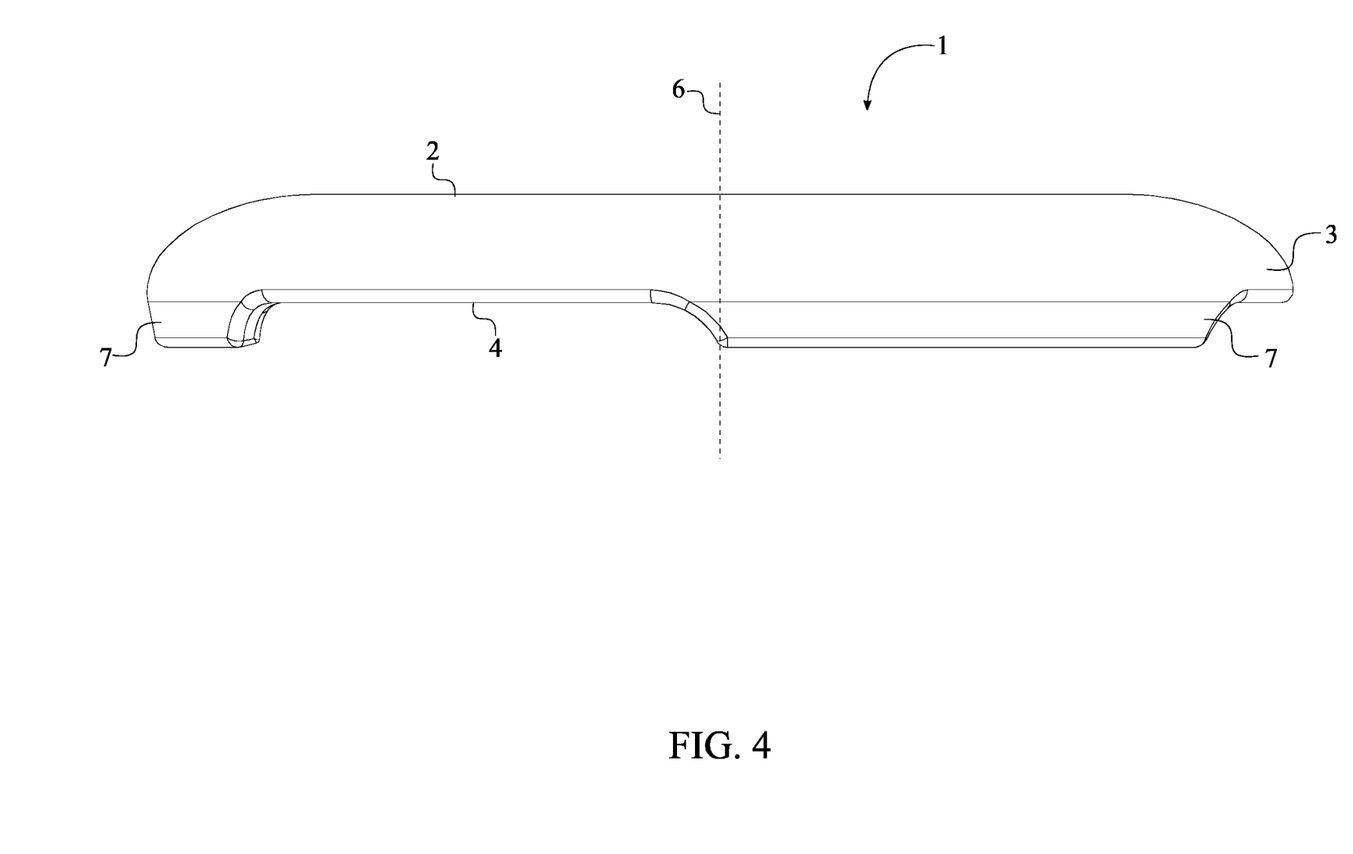
FIG. 4 is a side view of the cover.

In reference to FIG. 3-4, the cover 1 comprises a first base 2, an annular flange 3, a first edge 4, a first opening 5, and a central axis 6. The first base 2 is configured to cover the entire first adhesive pad 16 and also functions as a foundation body to hold other components of the cover 1. The annular flange 3 and the first base 2 are concentrically positioned along the central axis 6 as the annular flange 3 is radially connected to the first base 2. The annular flange 3 is configured to surround the side of the first adhesive pad 16 and preventing dust or other items from contacting the first adhesive pad 16 from the side. The first opening 5 is delineated by the annular flange 3 and the first base 2, wherein the first opening 5 is configured to receive the first adhesive pad 16. The first edge 4 is concentrically positioned around the central axis 6. The first edge 4 and the first base 2 are oppositely positioned of each other about the annular flange 3. The first edge 4 is configured to encircle around the outermost surface of the connector 11 to prevent dust or other unwanted objects from contacting or entering into the first adhesive pad 16.

Figure 10:
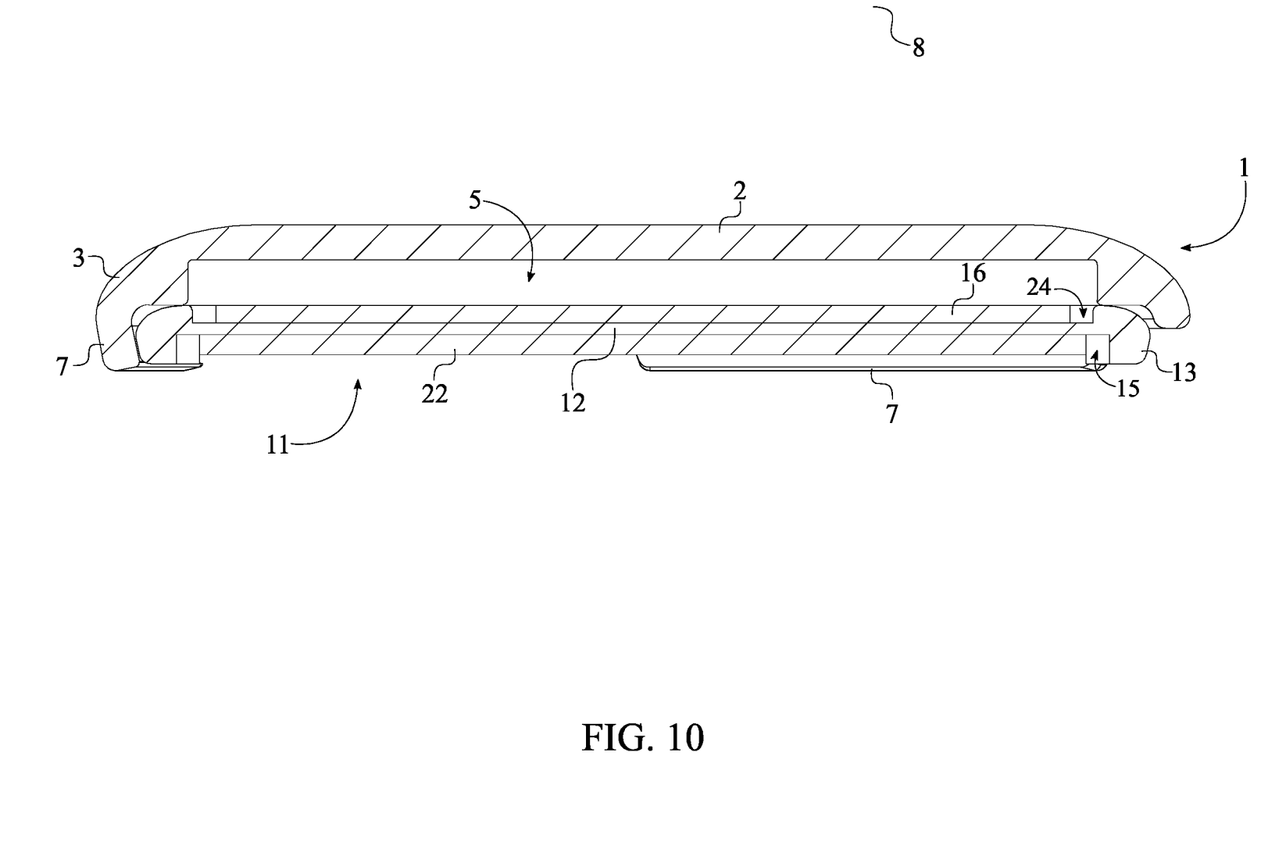
FIG. 10 is a cross section view of the present invention taken along line A-A of FIG. 9.

In reference to FIG. 3 and FIG. 10, each of the plurality of attachments 7 is perimetrically connected along the first edge 4. Each of the plurality of attachments 7 is angularly positioned to the first base 2 and is oriented toward the first base 2. Preferably, the present invention comprises three attachments 7 to fully engaged with the connector 11; however, the number of attachments 7 can differ upon consumer preference or product reliability. Furthermore, the radial positioning of each of the plurality of attachments 7 improves the elastic flexibility for each of the plurality of attachments 7 rather than having singular attachment around the first edge 4.

The connector 11 is configured as the base member for the first adhesive pad 16 and the second adhesive pad 22 to attach with the portable electronic devices or other relevant accessories and the mounting surface. In reference to FIG. 5-8, the connector 11 comprises a second base 12, the lateral wall 13, a top edge 23, a top opening 24, a bottom edge 14, and a bottom opening 15. More specifically, the top edge 23 and the bottom edge 14 are concentrically positioned around the lateral wall 13 and oppositely positioned of each other about the lateral wall 13 thus delineating the upper and lower edges. The lateral wall 13 is concentrically connected around the second base 12. The lateral wall 13 is radially configured so that the outer edges of the first adhesive pad 16 and the second adhesive pad 22 can be protected within the present invention. The second base 12 is positioned in between the top edge 23 and the bottom edge 14 in order to delineate two different cavities to place the both the first adhesive pad 16 and the second adhesive pad 22. In other words, the top opening 24 is delineated by the top edge 23 and the second base 12, and the bottom opening 15 is delineated by the bottom edge 14 and the second base 12.

Figure 5:
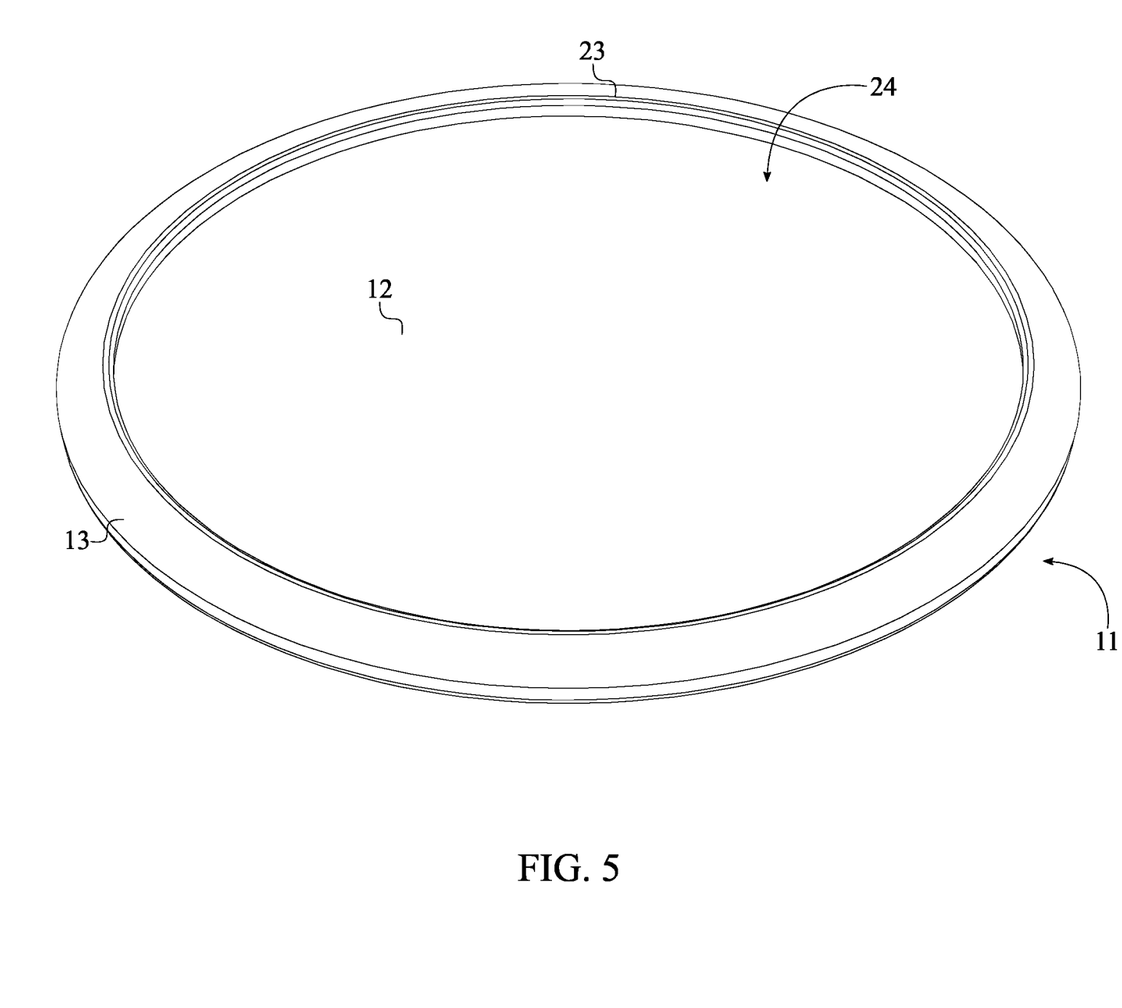
FIG. 5 is a top perspective view of the connector without the first adhesive pad and showing the top opening.
Figure 6:
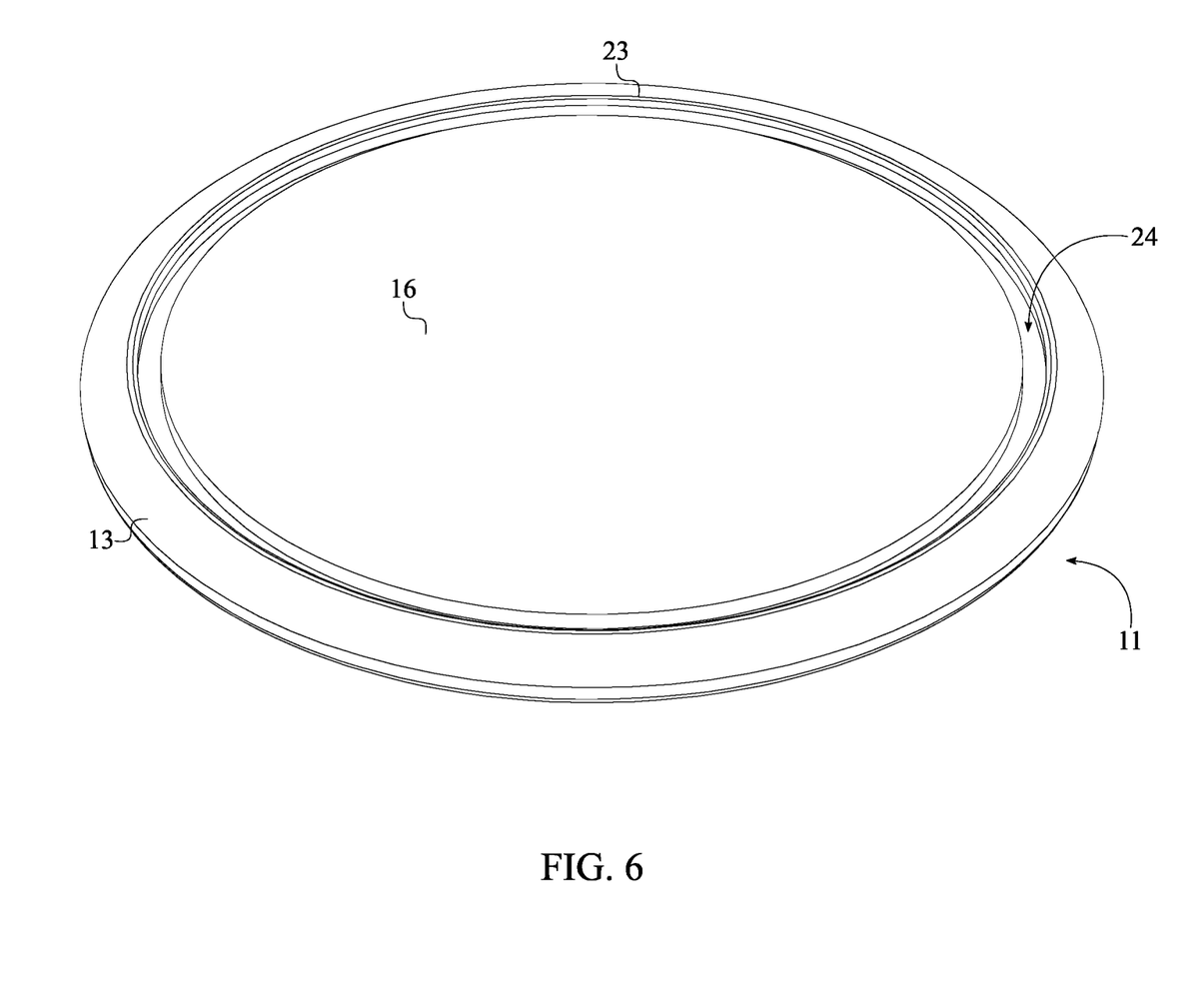
FIG. 6 is a top perspective view of the connector with the first adhesive pad.

In reference to FIG. 5-6, the first adhesive pad 16 is concentrically positioned about the top edge 23 and positioned within the top opening 24. Resultantly, the first adhesive pad 16 is superimposed onto the second base 12 via the top opening 24 so that the first adhesive pad 16 can temporarily attach to the mounting surface thus securing the present invention from one end. Furthermore, the height of the first adhesive pad 16 is slightly larger than the depth of the top opening 24 so that the first adhesive pad 16 can be slightly offset from the top edge 23 to complete the attachment between the first adhesive pad 16 and the mounting surface.

Figure 7:
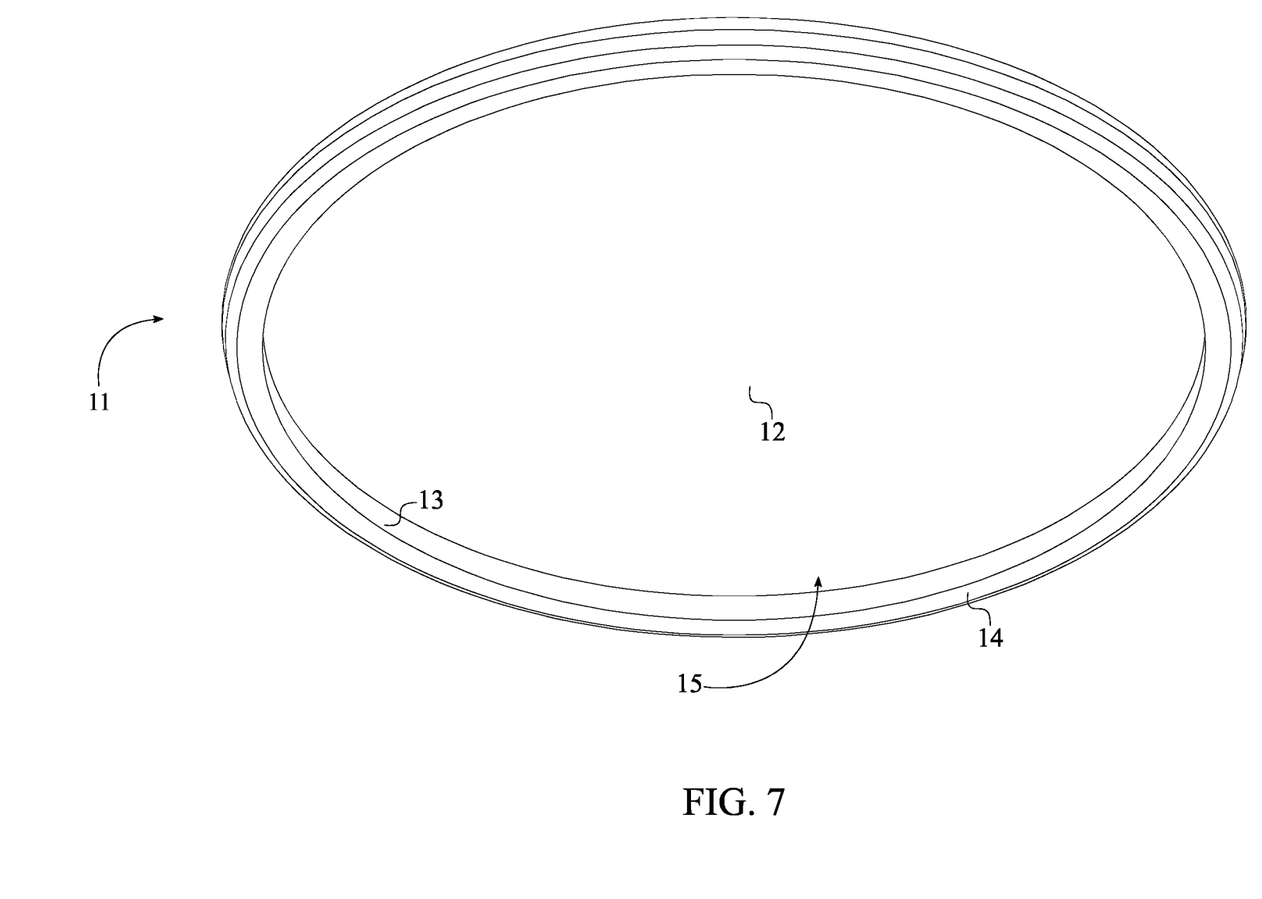
FIG. 7 is a bottom perspective view of the connector without the second adhesive pad and showing the bottom opening.
Figure 8:
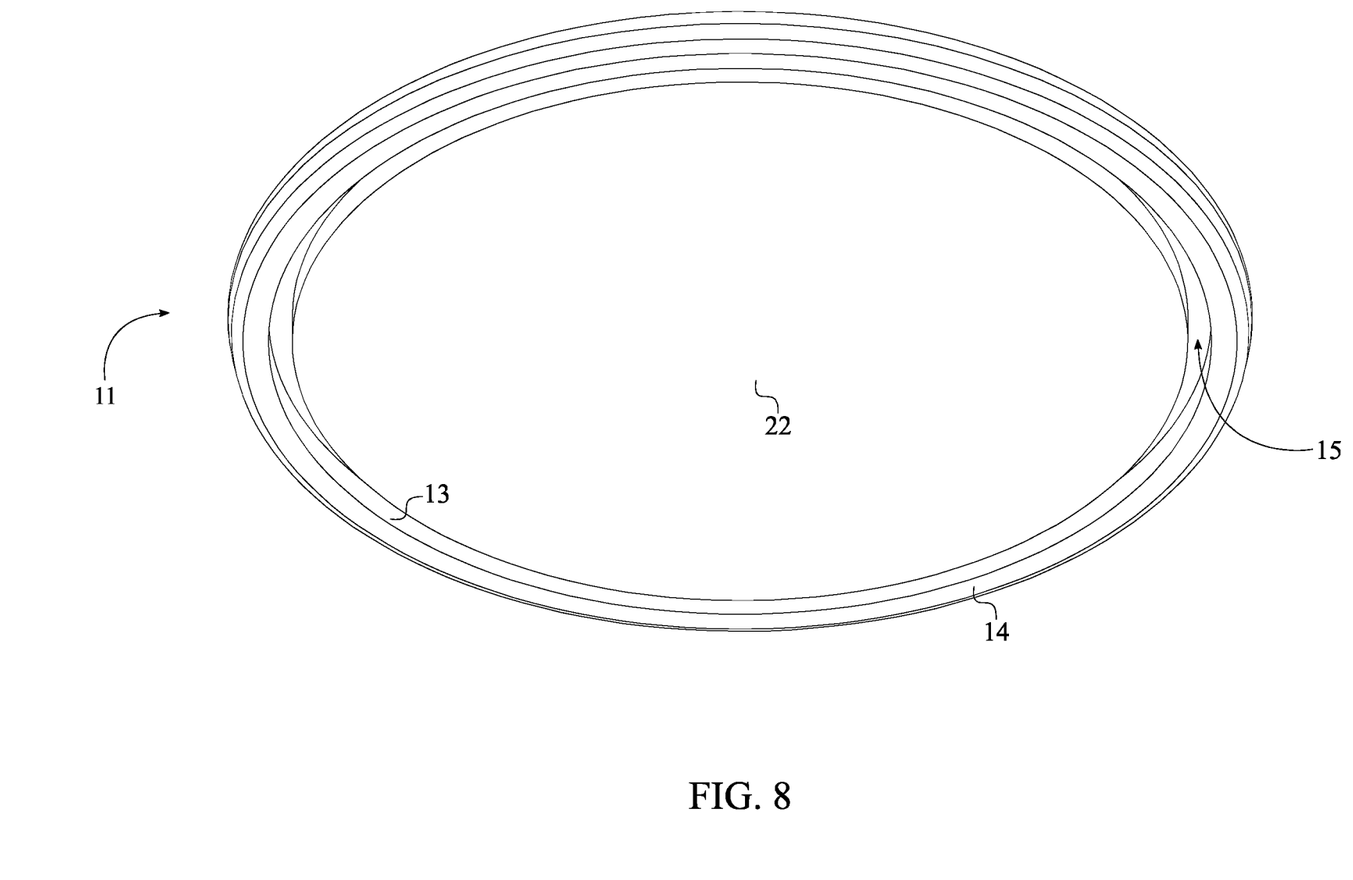
FIG. 8 is a bottom perspective view of the connector with the second adhesive pad.
Figure 9:
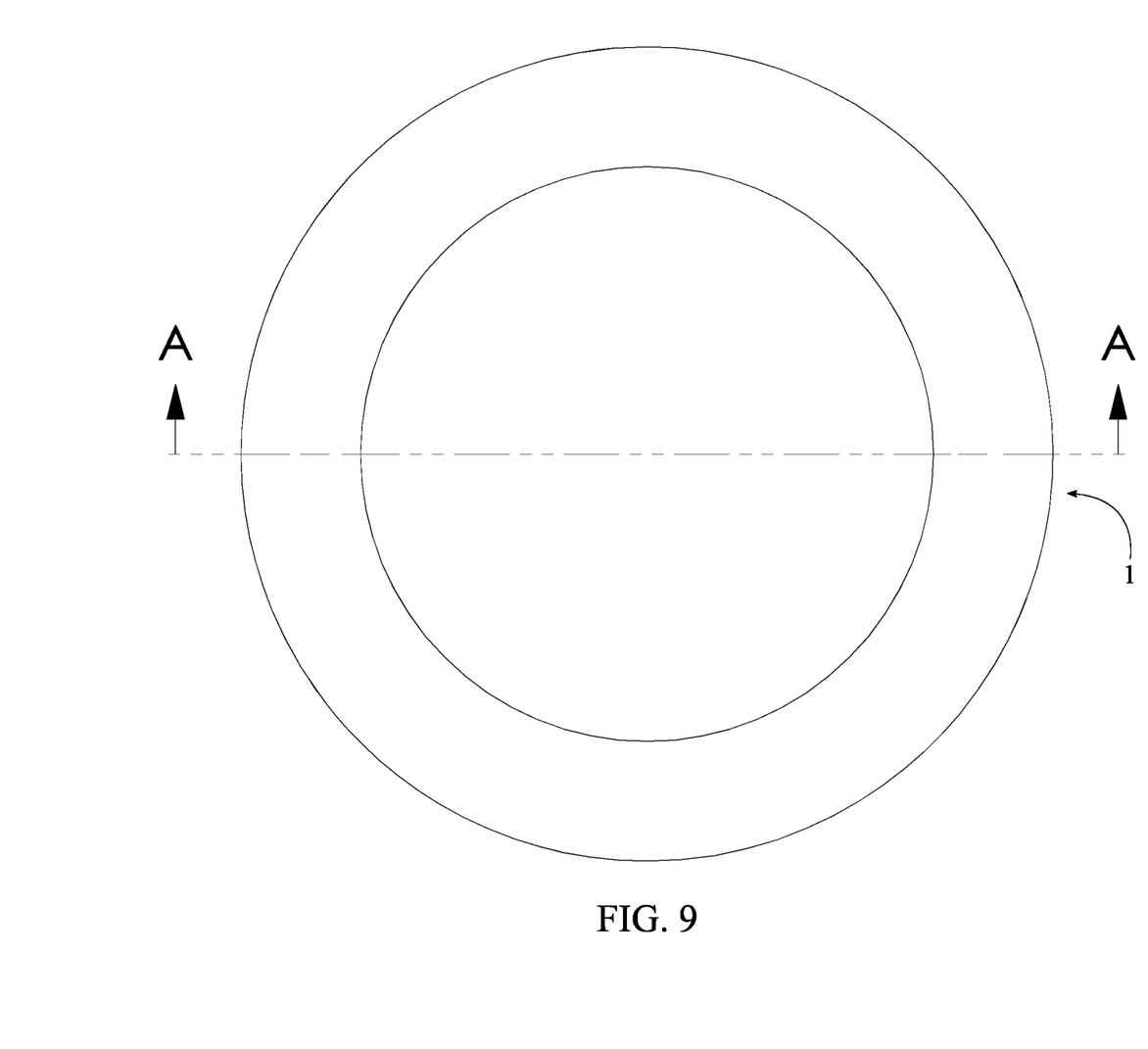
FIG. 9 is a top view of the cover, showing the plane upon which a cross section view is taken shown in FIG. 10.

In reference to FIG. 7-8, the second adhesive pad 22 is concentrically positioned about the bottom edge 14 and positioned within the bottom opening 15. Resultantly, the second adhesive pad 22 is superimposed onto the second base 12 via the bottom opening 15 so that the second adhesive pad 22 can temporarily attach to certain accessories, such as the popsocket grip, thus securing the present invention from opposite end. Furthermore, the height of the second adhesive pad 22 is smaller than the depth of the bottom opening 15 so that PopSocket or other incrementally-sizeable grip/stand phone accessory can be inserted into the bottom opening 15 to complete the attachment between the second adhesive pad 22 and the accessory.

In reference to FIG. 10, when the cover 1 is positioned atop the connector 11, each of the attachments 7 is externally positioned around the lateral wall 13. Once the cover 1 is pressed onto the connector 11, each of the attachments 7 is elastically flexed outward and then frictionally pressed against the lateral wall 13. Resultantly, the cover 1 can be removably mounted to the connector 11 through the engagement between each of the plurality of attachments 7 and the lateral wall 13. Due to the removable mounting of the between the cover 1 and the connector 11, the inside surface of the cover 1 can be integrated or printed with a quick response (QR) code that can be scanned to send a digital location of the user's phone.

Although the invention has been explained in relation to its preferred embodiment, it is to be understood that many other possible modifications and variations can be made without departing from the spirit and scope of the invention as hereinafter claimed.

What is claimed is:

1. A portable device accessory comprising:
   a cover;
   a plurality of angled attachments;
   a connector;
   a first adhesive pad;
   the plurality of attachments being adjacently connected to the cover;
   the plurality of angled attachments being radially distributed around the cover;
   the first adhesive pad being positioned between the cover and the connector;
   the first adhesive pad being terminally connected to the connector;
   the first adhesive pad being enclosed by the cover; and
   the connector and the cover being attached to each other by the plurality of attachments and a lateral wall of the connector.

2. The portable device accessory as claimed in claim 1 comprising:
   the cover comprising a first base, an annular flange, a first edge, a first opening, and a central axis; the annular flange and the first base being concentrically positioned along the central axis;
   the annular flange being radially connected to the first base;
   the first opening being delineated by the annular flange and the first base;
   the first edge being concentrically positioned around the central axis; and
   the first edge and the first base being oppositely positioned of each other about the annular flange.

3. The portable device accessory as claimed in claim 1 comprising:
   the cover comprising a first base and a first edge;
   each of the plurality of angled attachments being perimetrically connected along the first edge;
   each of the plurality of attachments being angularly positioned to the first base;
   each of the plurality of attachments being oriented toward the first base.

4. The portable device accessory as claimed in claim 1 comprising:
- the connector comprising a second base, a top edge, a top opening, a bottom edge, and a bottom opening;
- the top edge and the bottom edge being concentrically positioned around the lateral wall;
- the top edge and the bottom edge being oppositely positioned of each other about the lateral wall;
- the lateral wall being concentrically connected around the second base;
- the second base being positioned in between the top edge and the bottom edge;
- the top opening being delineated by the top edge, the lateral wall, and the second base; and
- the bottom opening being delineated by the bottom edge, the lateral wall, and the second base.

5. The portable device accessory as claimed in claim 4 comprising:
- the first adhesive pad being concentrically positioned about the top edge;
- the first adhesive pad being positioned within the top opening; and
- the first adhesive pad being superimposed onto the second base.

6. The portable device accessory as claimed in claim 1 comprising:
- a second adhesive pad;
- the first adhesive pad and the second adhesive pad being concentrically positioned opposite of each other about the connector; and
- the second adhesive pad being terminally connected to the connector.

7. The portable device accessory as claimed in claim 6 comprising:
- the connector comprising a second base, a bottom edge, and a bottom opening;
- the second adhesive pad being concentrically positioned about the bottom edge;
- the second adhesive pad being positioned within the bottom opening; and
- the second adhesive pad being superimposed onto the second base.

8. The portable device accessory as claimed in claim 1 comprising:
- each of the attachments being externally positioned around the lateral wall; and
- each of the attachment being frictionally pressed against the lateral wall.

* * * * *